United States Patent

Watkins et al.

[11] Patent Number: 5,933,657
[45] Date of Patent: Aug. 3, 1999

[54] MAKING OF FILM SCROLLS FOR PREWIND CAMERAS

[75] Inventors: Joseph Albert Watkins, Rochester; James Edmund Fredell, Brockport; Duane Blair Kirk, Hilton, all of N.Y.

[73] Assignee: Eastman Kodak Company, Rochester, N.Y.

[21] Appl. No.: 08/607,844

[22] Filed: Feb. 27, 1996

Related U.S. Application Data

[60] Provisional application No. 60/002,893, Aug. 29, 1995.

[51] Int. Cl.⁶ .......................... G03B 17/02; B65M 18/10
[52] U.S. Cl. .......................... 396/6; 396/388; 242/348.1
[58] Field of Search .......................... 396/6, 387, 388; 242/332.7, 332.8, 348.1, 338.4

[56] References Cited

U.S. PATENT DOCUMENTS

| | | | |
|---|---|---|---|
| 3,364,551 | 1/1968 | Napor et al. | |
| 3,364,552 | 1/1968 | Napor et al. | |
| 3,457,627 | 7/1969 | Naport et al. | |
| 3,481,552 | 12/1969 | Gersch et al. | 242/71.1 |
| 3,586,258 | 6/1971 | Horlezeder | 242/197 |
| 3,742,586 | 7/1973 | Butler et al. | 29/430 |
| 3,748,715 | 7/1973 | Hoover et al. | 29/211 |
| 3,930,296 | 1/1976 | Hoover | 29/430 |
| 4,100,667 | 7/1978 | Napor et al. | 29/429 |
| 4,180,905 | 1/1980 | Klinkhammer et al. | 29/786 |
| 4,205,436 | 6/1980 | Klotz et al. | 29/783 |

(List continued on next page.)

FOREIGN PATENT DOCUMENTS

| | | | |
|---|---|---|---|
| 058583A2 | 7/1993 | European Pat. Off. | G03B 17/26 |
| 0584583A2 | 7/1993 | European Pat. Off. | G03B 17/26 |
| 0615153A1 | 3/1994 | European Pat. Off. | G03B 17/30 |
| 0622662A2 | 4/1994 | European Pat. Off. | G03B 17/26 |
| 0632314A2 | 5/1994 | European Pat. Off. | G03B 17/26 |
| 52-115215 | 9/1977 | Japan | G03C 3/00 |
| 52-140321 | 11/1977 | Japan | G03C 3/00 |
| 59-143841 | 8/1984 | Japan | B65H 17/22 |
| 63-271326 | 11/1988 | Japan | G03B 17/02 |
| 64-544 | 1/1989 | Japan | G03C 3/00 |
| 2-52340 | 2/1990 | Japan | G03C 3/00 |
| 3-2751 | 1/1991 | Japan | G03C 3/00 |
| 3-3752 | 1/1991 | Japan | G03C 3/00 |
| 4-3039 | 1/1992 | Japan | G03B 17/30 |
| 4-116641 | 4/1992 | Japan | G03C 3/00 |
| 4-251250 | 9/1992 | Japan | G03C 3/00 |
| 5-134361 | 5/1993 | Japan | G03C 3/00 |
| 5-142647 | 6/1993 | Japan | G03B 17/28 |
| 5-323517 | 12/1993 | Japan | G03C 3/00 |
| 6-51443 | 2/1994 | Japan | G03C 3/00 |
| 6-75336 | 3/1994 | Japan | G03C 3/00 |
| 6-95294 | 4/1994 | Japan | G03C 1/76 |
| 6-123941 | 5/1994 | Japan | G03C 3/00 |
| 6-130568 | 5/1994 | Japan . | |
| 6-148809 | 5/1994 | Japan | G03C 3/00 |
| 6-175272 | 6/1994 | Japan | G03C 1/765 |
| 6-266054 | 9/1994 | Japan | G03C 3/00 |
| 6-289541 | 10/1994 | Japan | G03C 3/00 |
| 6-295020 | 10/1994 | Japan . | |
| 6-295022 | 10/1994 | Japan . | |
| 6-332118 | 12/1994 | Japan | G03C 3/00 |
| 7-43859 | 2/1995 | Japan | G03C 3/00 |

OTHER PUBLICATIONS

JP 940922 A2 6266054 Abstract.

*Primary Examiner*—Safet Metjahic
*Assistant Examiner*—Michael Dalakis
*Attorney, Agent, or Firm*—Charles E. Snee, III; Gordon M. Stewart

[57] ABSTRACT

A method for forming a film scroll and assembling the film scroll into a non-lighttight camera body begins in a darkroom by winding a filmstrip into a film feed roll from a filmstrip source, such as a stockroll onto a winding quill after attaching a formed leading portion thereto. According to the present invention, an outer end of the film feed roll is attached to a film spool of a film cartridge to form a prewound scroll and cartridge assembly for loading into respective chambers of the non-lighttight camera body section. A cover is then fixed to the camera body section to make the camera lighttight.

3 Claims, 9 Drawing Sheets

U.S. PATENT DOCUMENTS

| | | | |
|---|---|---|---|
| 4,228,579 | 10/1980 | Dunkel et al. | 29/430 |
| 4,306,799 | 12/1981 | Johnson | 354/266 |
| 4,884,087 | 11/1989 | Mochida et al. | 354/75 |
| 4,954,857 | 9/1990 | Mochida et al. | 354/75 |
| 4,972,649 | 11/1990 | Mochida et al. | 53/430 |
| 5,126,775 | 6/1992 | Nakai et al. | 354/288 |
| 5,146,255 | 9/1992 | Nakai et al. | 354/288 |
| 5,202,713 | 4/1993 | Nakai et al. | 354/212 |
| 5,268,713 | 12/1993 | Kataoka | 354/288 |
| 5,311,231 | 5/1994 | Suzuki et al. | 354/288 |
| 5,343,265 | 8/1994 | Oi et al. | 354/222 |
| 5,465,619 | 11/1995 | Sotack et al. | 73/304 C |
| 5,466,533 | 11/1995 | Fitzgerald et al. | 428/447 |
| 5,467,175 | 11/1995 | Takagaki et al. | 355/259 |
| 5,467,176 | 11/1995 | Watanuki et al. | 355/270 |
| 5,467,177 | 11/1995 | Iwama et al. | 355/282 |
| 5,467,178 | 11/1995 | Mui et al. | 355/285 |
| 5,467,179 | 11/1995 | Boeck et al. | 355/309 |
| 5,467,181 | 11/1995 | Doi | 355/319 |
| 5,467,182 | 11/1995 | Hower, Jr. et al. | 355/319 |
| 5,467,183 | 11/1995 | Snelling | 355/326 |
| 5,467,196 | 11/1995 | Fukushima et al. | 348/298 |
| 5,576,789 | 11/1996 | Patton | 396/418 |
| 5,584,442 | 12/1996 | Watkins et al. | 242/348.1 |
| 5,613,165 | 3/1997 | Dobbs et al. | 396/6 |

MAKING OF FILM SCROLLS FOR PREWIND CAMERAS

CROSS REFERENCE TO RELATED APPLICATION

Reference is made to and priority claimed from U.S. Provisional Application Serial No. 60/002,893, filed Aug. 29, 1995, entitled MAKING OF FILM SCROLLS FOR PREWIND CAMERAS.

CROSS REFERENCE TO RELATED APPLICATIONS

This application discloses certain features which correspond or are similar to features of copending U.S. Ser. No. 08/427,531, filed Apr. 24, 1995 by Joseph A. Watkins et al. The disclosure of that application is hereby incorporated by reference in this application.

FIELD OF THE INVENTION

This invention relates generally to the field of photography, and in particular to generation of a film scroll for a prewind camera. More specifically, the invention relates to apparatus and a related method of generating a film feed roll which is attached to a spool in a film cartridge to form a scroll and for loading of the film scroll and cartridge into a camera body.

BACKGROUND OF THE INVENTION

In the assembly of prewind cameras, such as the so-called single-use camera manufactured by Eastman Kodak Company and Fuji Photo Ltd., it is desired to have the unexposed film predisposed in the form of a roll and placed in a chamber on one side of the camera body before the customer receives the product. As the customer sequentially exposes the film, it is advanced into a lighttight film cartridge or cassette located in a separate chamber on the other side of the camera body, relative to an exposure station. After all of the exposures have been taken, the camera is returned to a photo finisher for processing at which time the camera body is opened under ordinary or white light conditions because the film is protected inside a lighttight container; that is, the film cartridge.

According to U.S. Pat. No. 4,972,649, among others, the loading of film for a prewind camera is typically accomplished by first unwinding the film by withdrawing the unexposed film from its original lighttight cartridge and then creating a film roll inside the camera body, or creating a film roll outside the camera body and then inserting the formed film scroll, that is, the cartridge and the associated film roll into the camera body.

A number of disadvantages are created by using either method described above. Consider the instance where the film is prewound prior to loading the scroll into the camera body. If the cartridge is of the thrusting type, such as described in U.S. Pat. Nos. 5,031,852, and 5,347,334, among others, in which the film leader does not protrude, but rather must be thrust from the interior of the cartridge onto a film take-up spool or winding quill, then the lighttight door of the cartridge must first be opened prior to advancing the film and the film must then be wound out of the cartridge.

For film advance, the film thrusting and the film winding operations are each speed limited, and must be done in a sequential order. Therefore, the cycle time for film loading is affected adversely. Winding speed is limited due to the fear that film abrasions and scratches may develop upon the film exiting the cartridge opening. Additionally, the exit path of the film is curved from the cartridge and is not straight, making tension control of the process highly impractical. In addition, the film scroll is formed with the emulsion side facing downward, making mechanical support and guiding of the film during winding difficult.

If the film is wound from the cartridge into a film roll after insertion into the body of the single-use camera, similar problems exist. Winding speed is limited by contact between the emulsion side and the camera body. It is also difficult to guide the film leader across the camera body to form a scroll. The camera design must accommodate the tooling that is required to perform this process. For example, there must be access for a winding quill or shaft to enter the camera body for scroll making.

SUMMARY OF THE INVENTION

The present invention is directed to overcoming one or more of the problems set forth above. Briefly summarized, according to one aspect of the present invention, there is provided a method of forming a film scroll and assembling the film scroll into a lens fitted lighttight camera body for exposure by an end user, characterized by:

winding a filmstrip into a film feed roll in a darkroom;

attaching an outer end of the film feed roll to the film spool of a film cartridge;

placing the film cartridge and the unexposed film feed roll into separate chambers of a non-lighttight camera body section; and fixing a lighttight cover to the camera body section.

According to another aspect of the present invention, there is provided an apparatus for forming a film scroll which is loaded into a lighttight camera in a dark environment and is characterized by:

winding means for forming a film feed roll from a stockroll;

means for attaching an end of a formed film feed roll into a film cartridge, thereby forming a film scroll; and, means for loading said film scroll into said camera.

An advantageous aspect of the present invention is that a method is provided for making a defect free film scroll which can be created at higher speeds under accurate tension control and with fewer sequential operations. Beginning with a bulk film roll, separate film strips can be cut and separated into film feed rolls having accurately controlled ends. An end of each roll can then be positioned and attached to a spool in an empty film cartridge to form a scroll. The scroll and attached cartridge can then be loaded into a camera body.

Another advantageous aspect of the present invention is that the design of the camera body is not encumbered by features which are typically necessary for film thrusting, attachment and winding of the film inside the camera body.

Another advantageous aspect of the present invention is that the risk of film damage, such as scratching and abrasions, is significantly reduced by not requiring that the film be unwound from the film cartridge.

These and other aspects, objects, features and advantages of the present invention will be more clearly understood and appreciated from a review of the following Detailed Description of the Invention and appended Claims, and by reference to the accompanying drawings.

DETAILED DESCRIPTION OF THE INVENTION

Figure 1:
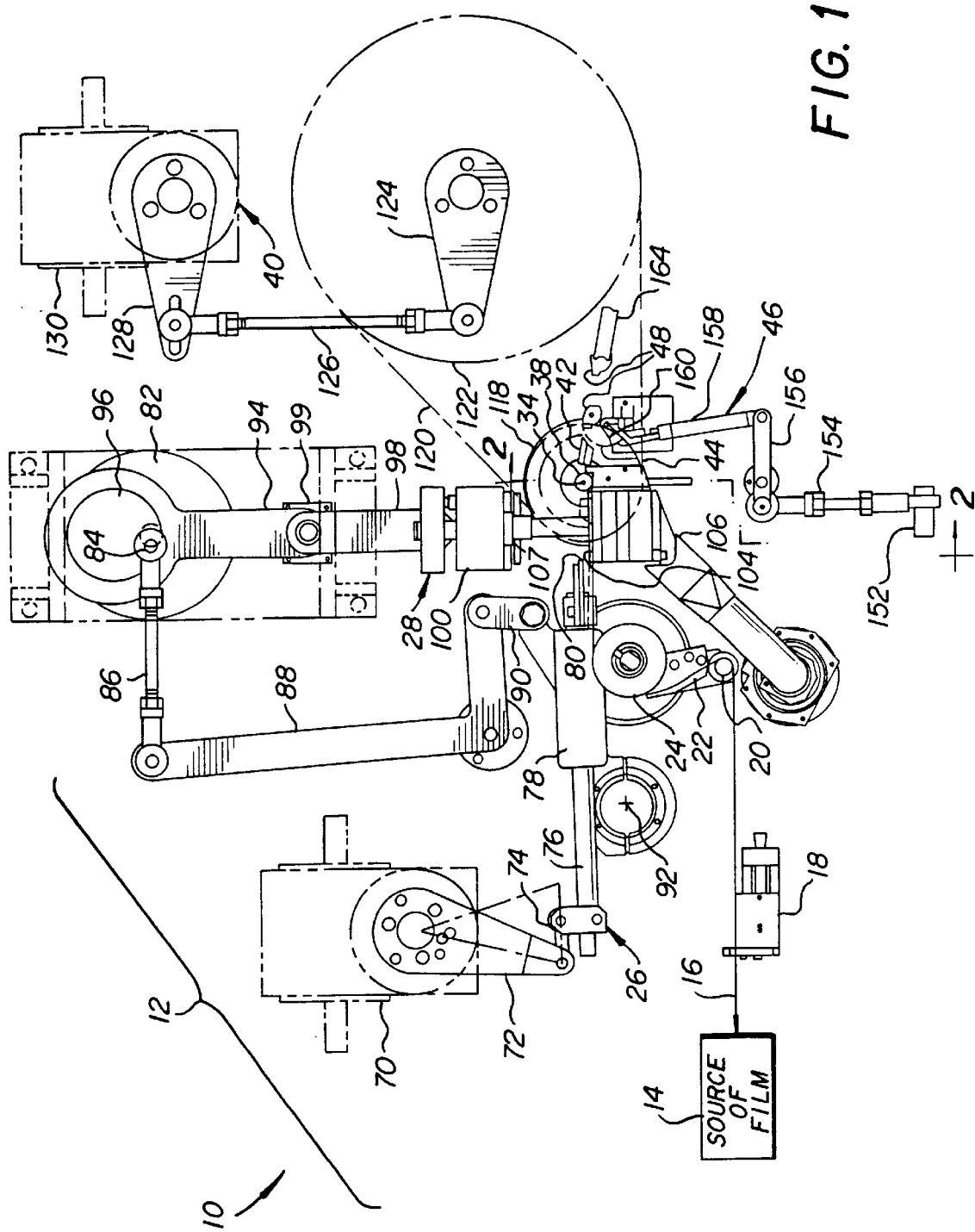
FIG. 1 is a side elevational view of a film scroll forming apparatus in accordance with a preferred embodiment of the present invention.
Figure 2:
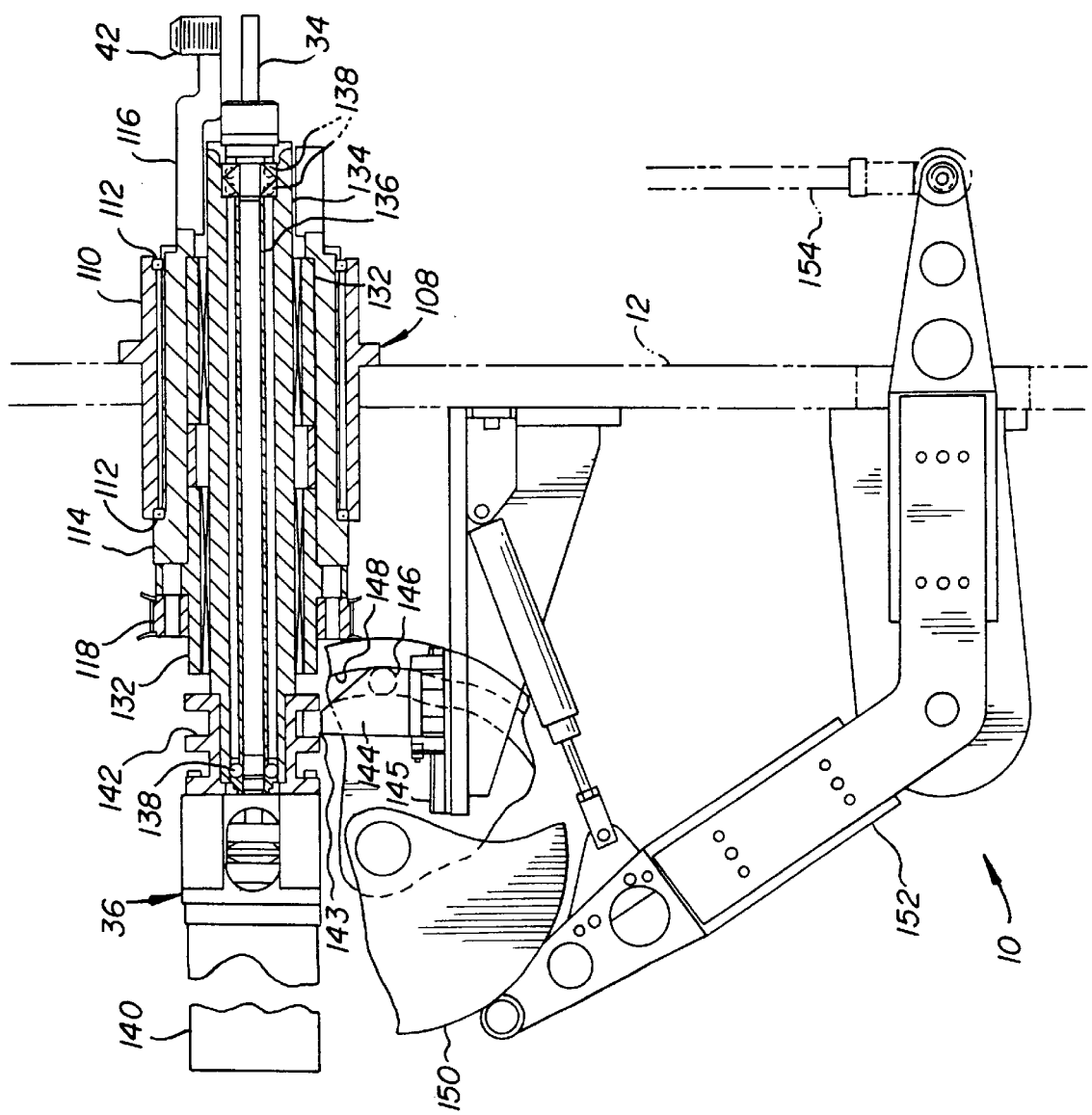
FIG. 2 is a cross-sectional view through a portion of a film winding and attaching mechanism as seen from the line 2—2 of FIG. 1.

Following is a detailed description of a preferred embodiment of the invention, reference being made to the drawings in which the same reference numerals identify the same elements of structure in each of the several figures.

Referring first to FIG. 1 of the drawings, numeral 10 generally indicates a film scroll forming apparatus in accordance with the invention. Apparatus 10 includes a typically vertical face plate 12 supporting a source 14 of an indeterminate length of web, such as photographic film on a bulk film roll, to be formed into a film scroll. A horizontal or angled face plate also can be used without departing from the invention. The web may, if desired, be provided with edge perforations, although they are not required by the invention.

From the source 14, the web, in this case photographic film 16, is passed across a registration sensor 18 and around a fixed idler 20. From the idler 20, the film is guided up along the surface of an air turtleback 22 and passes around a vacuum metering drum 24. A sprocket drum could be substituted if the film is perforated.

A shuttle mechanism 26 is provided to intermittently engage the film and move it through a trimming punch and die press 28 which trims the leading and trailing ends 30, 32 respectively (FIG. 6) of each film strip. The shuttle mechanism 26 moves a previously trimmed leading end of a film strip across the die to a rotatable quill 34. As illustrated in FIGS. 1–6, the quill 34 is of the slotted type, having a cross slot 35 for receiving the film. However, a quill having vacuum or other film securing means can alternatively be used. The quill 34 is rotated by a motor drive 36 (FIG. 2) to form a film roll 38 on the quill, still connected across the die press 28 with the bulk film 16. The die press 28 is then actuated to separate the film roll 28 from the bulk film 16, thereby forming the trailing end 32 of the film roll and the leading end 30 of the bulk film strip 16 from which the next film roll is to be formed.

Figure 3:
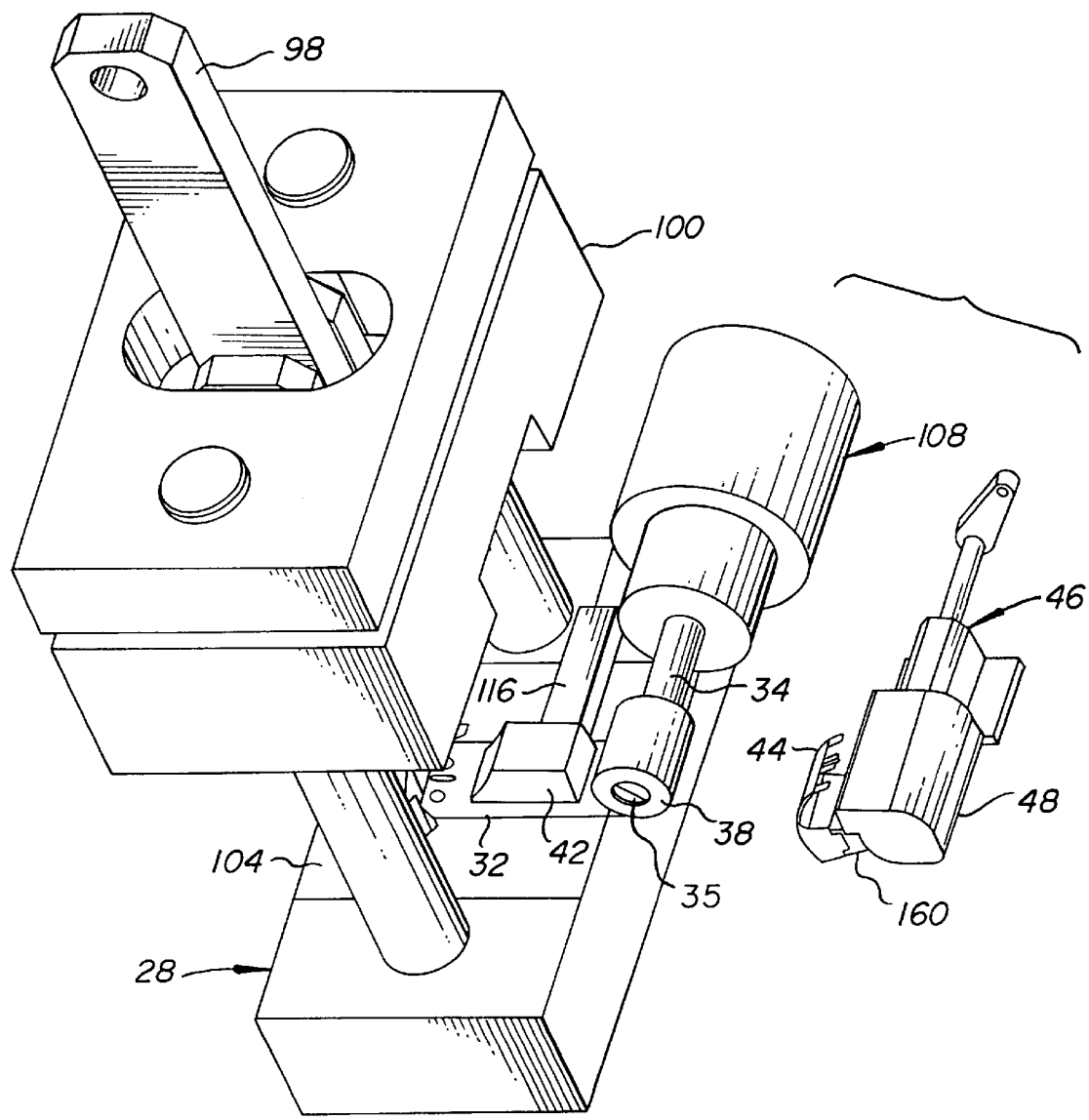
FIGS. 3–5 are pictorial views illustrating operation of a film flipper and related mechanisms.
Figure 4:
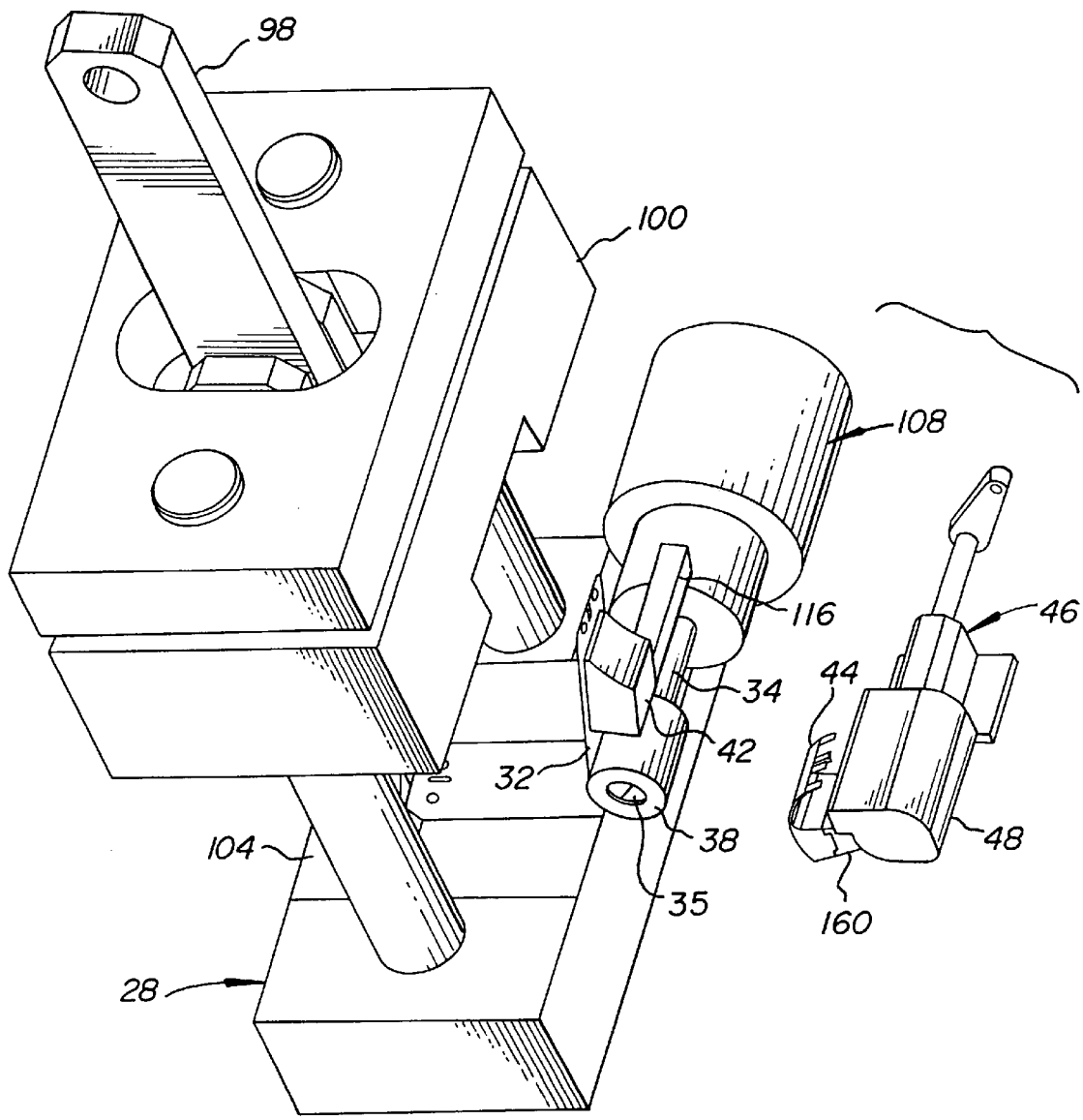
Figure 5:
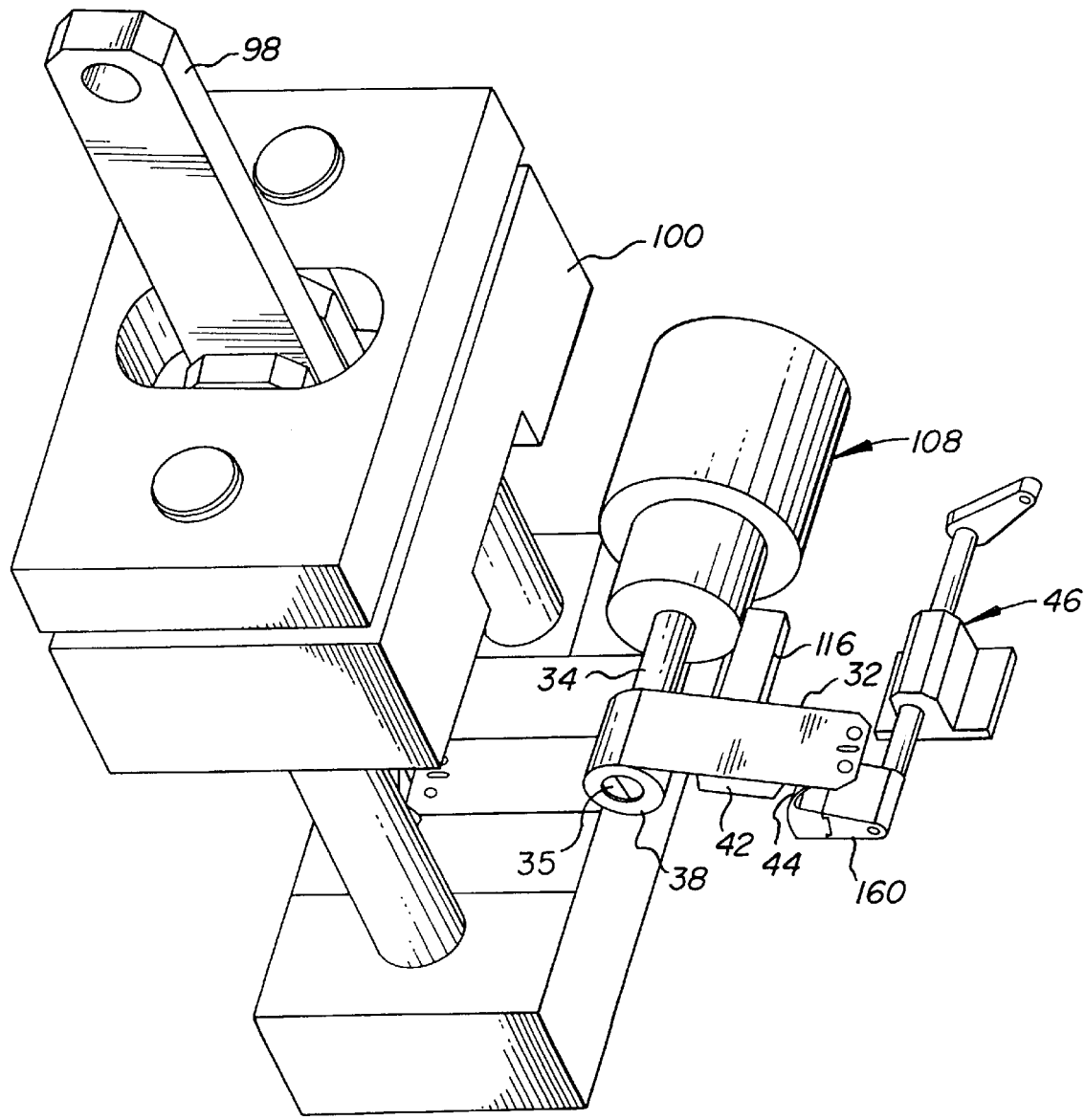
Figure 6:
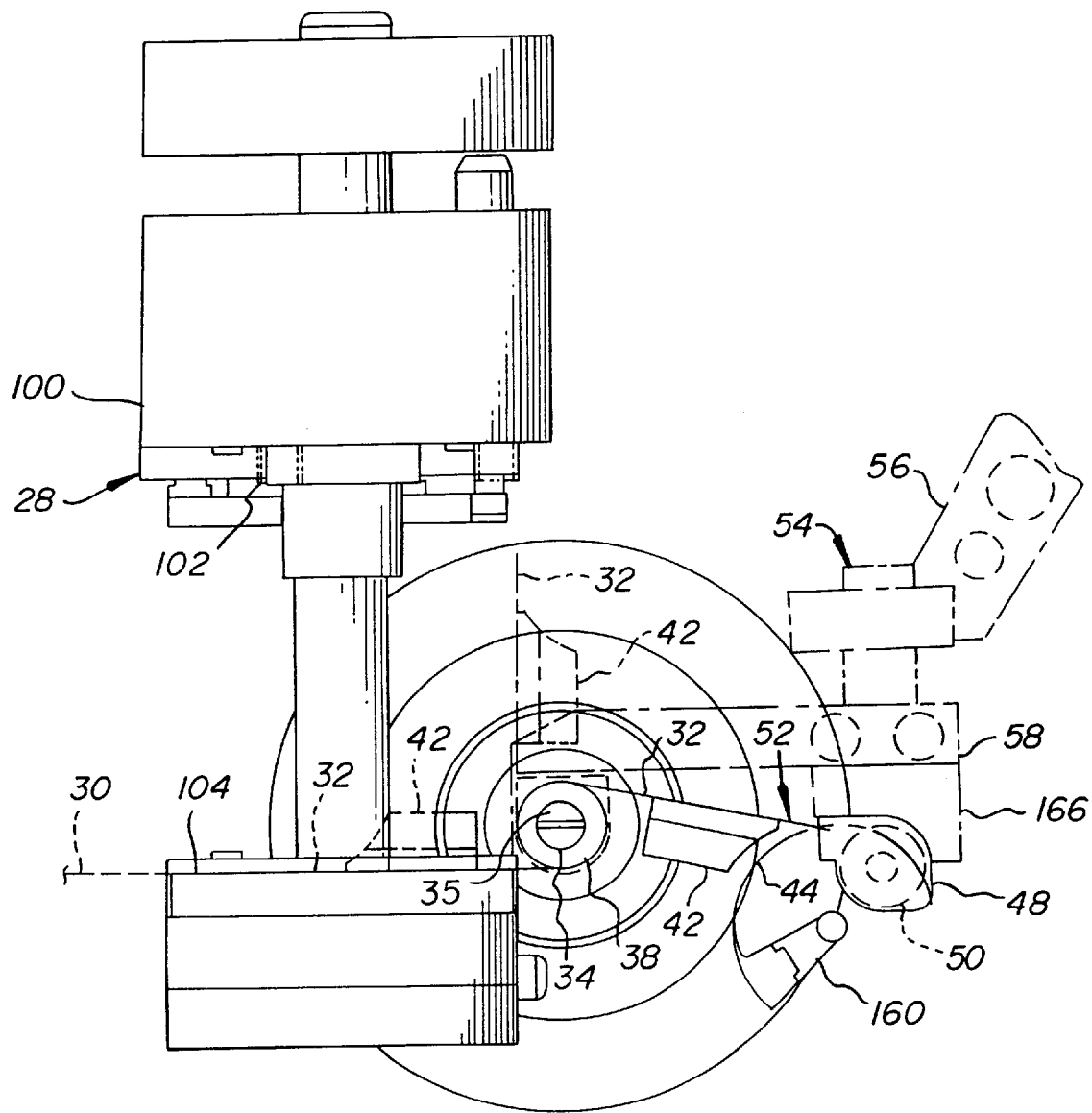
FIG. 6 is an enlarged side elevational view illustrating operation of the film flipper and gripper mechanisms.

An oscillating drive 40 is then operated to rotate a film flipper or vacuum platen 42 against the film trailing end 32 as shown in FIGS. 3 and 6. Drive 40 is then moved to lift the film trailing end 32 as shown in FIGS. 4 and 6, and rotate it into position against an attaching blade 44 as shown in FIGS. 5 and 6. Blade 44 is then oscillated by an attaching mechanism 46 to draw the film trailing end 32 into a film cartridge 48 for attachment to a film spool 50 within the cartridge 48 (see FIG. 6), after which the attaching blade 44 is retracted.

Figure 7:
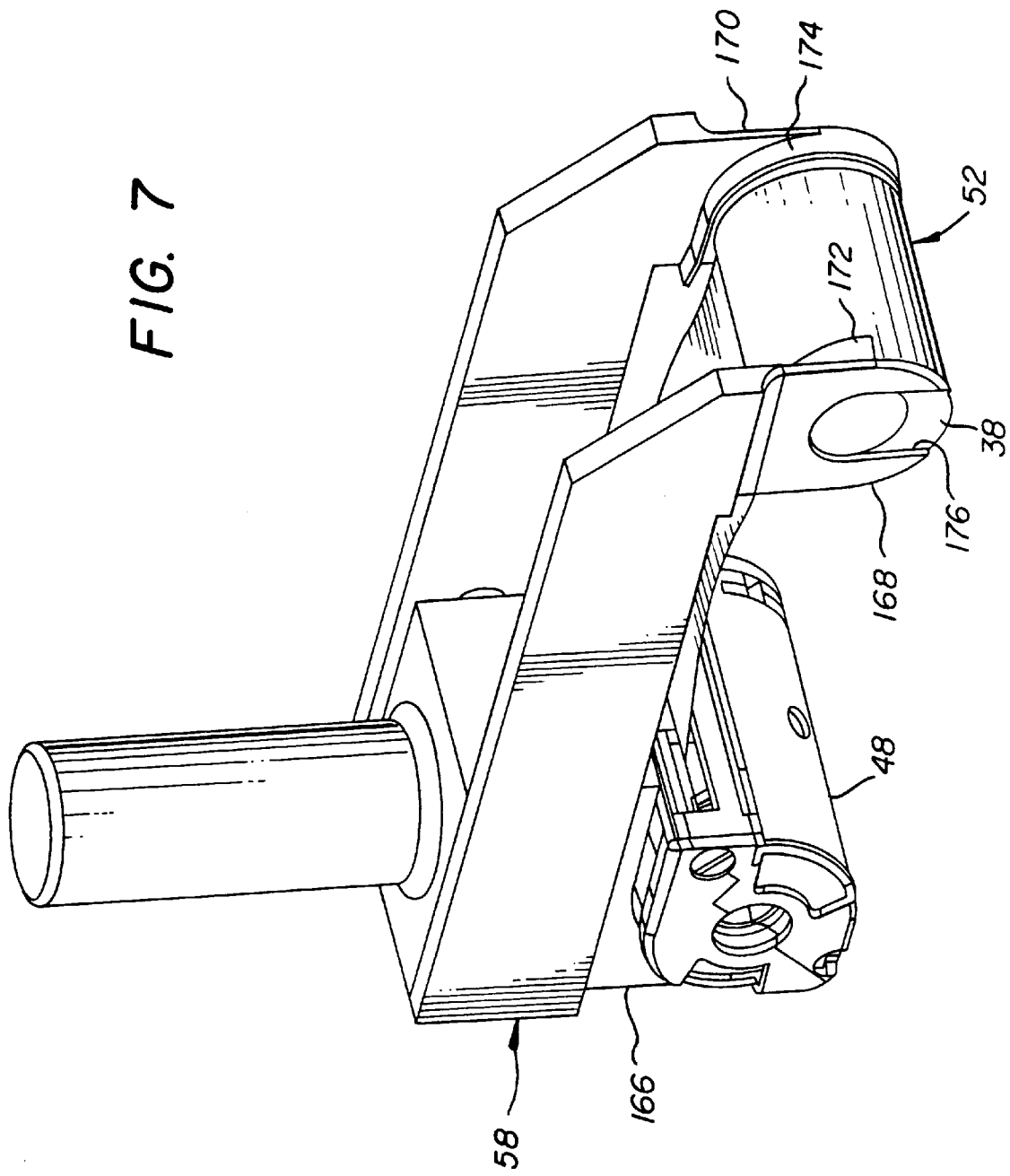
FIGS. 7 and 8 are pictorial views of a gripper holding an assembled film scroll and cartridge for transfer to a camera body.
Figure 8:
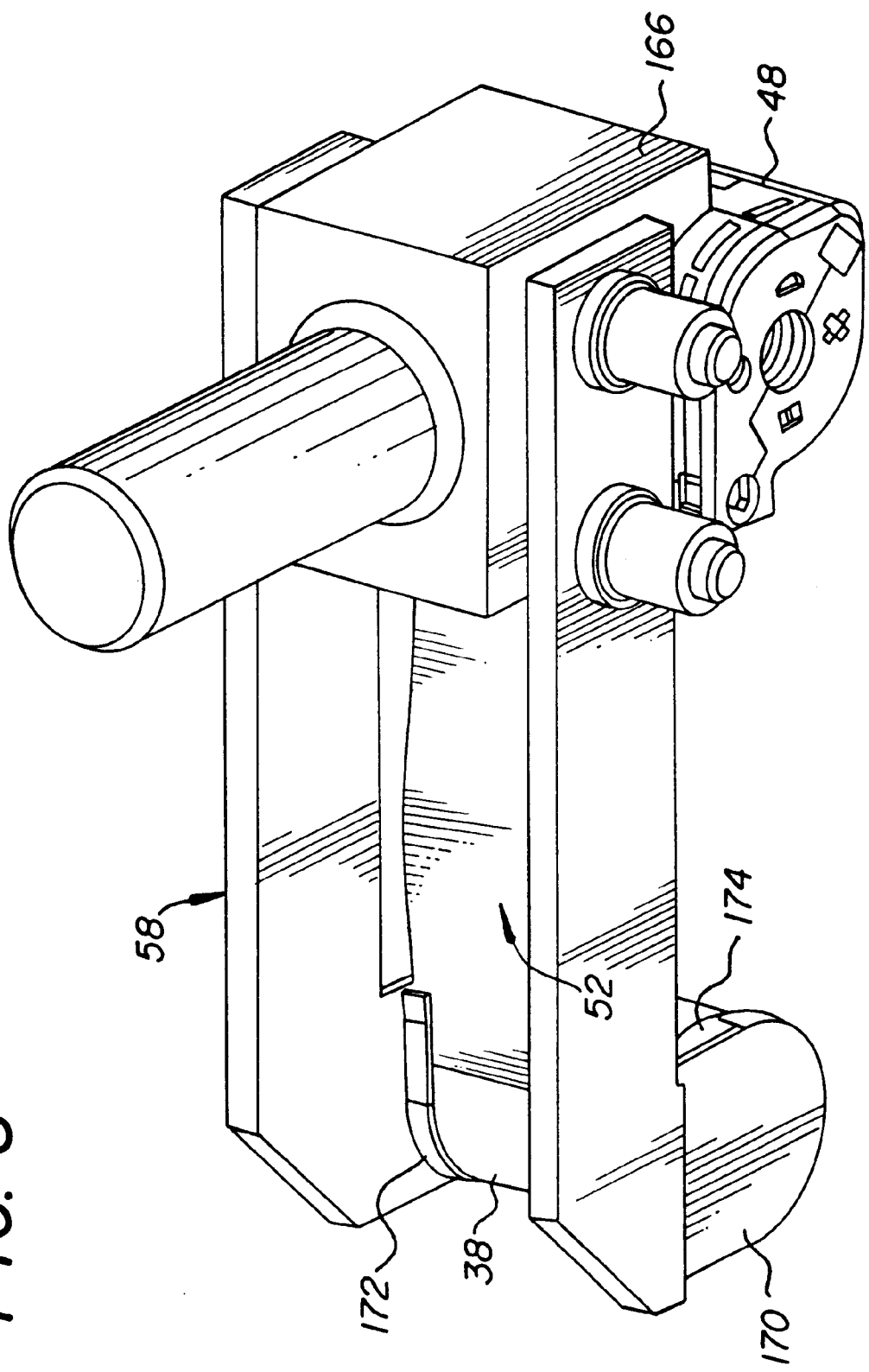

The film roll 38 with its trailing end 32 connected to the film spool 50 comprises a film scroll 52 which, together with the film cartridge 48 surrounding spool 50, is to be loaded into a single-use camera body. To accomplish this purpose, a scroll retainer mechanism 54 is utilized as shown in part in phantom lines in FIG. 6. Mechanism 54 includes a robot arm 56 connected with a gripper 58 which simultaneously grasps the ends of the film roll 38 and the body of the film cartridge 48. The quill 34 is then withdrawn, as will be subsequently more fully described, and the film scroll 52 is lifted out of the scroll forming apparatus 10 and carried as shown in FIGS. 7 and 8 to an adjacent station for placement in a camera body 60, partially shown in FIG. 9. The scroll 52, with its associated cartridge 48, is deposited in spaced dual recesses 62, 64 of body 60 with the film trailing end 32 extending across a lens fitted opening 66 between the recesses. After the scroll and cassette are in place, a lighttight cover 68 is fitted over the recesses, closing the camera body 60 for advancement of the film into the cassette during normal use.

The general structure and operation of the scroll forming apparatus 10 and the associated scroll retainer mechanism 54 have been described above. More specific information regarding the various mechanisms utilized in the systems described above is set forth below.

The air turtleback 22 and vacuum metering drum 24 operate together with the registration sensor 18 to guide the bulk film 16 from the idler roller 20 around the metering drum 24 and to stop the film transfer motion onto the film roll 38 when a predetermined length of film has been wound onto the roll 38.

The shuttle mechanism 26 includes a shuttle drive 70 which is operable to actuate an oscillating drive arm 72 connected to a link 74. The link connects with one end of a reciprocating shuttle arm 76 that reciprocates in a shuttle bearing 78 and carries on its other end a vacuum tip 80. The vacuum tip 80 not only reciprocates but is also given a slight vertical motion by further mechanism including a rotary shaft 82 having a small eccentric 84 connected through a horizontal link 86 with a drive lever 88. Lever 88 connects through a link 90 with an extension of the shuttle bearing 78. Rotation of the shaft 82 rotates the eccentric 84 in a small circular path, causing lever 88 to raise and lower the body of the shuttle bearing 78, oscillating it about a pivot 92. This motion combined with the reciprocating motion of the shuttle arm 76, causes the vacuum tip 80 to move in a manner to lower and pick up the film 16 and slide the pre-trimmed leading end 30 forward to engage the quill 34. The vacuum tip 80 then raises and retracts to the initial position as shown in FIG. 1 of the drawings.

The trimming punch and die press mechanism 28 includes a connecting rod 94 actuated by a large eccentric 96 on shaft 82. Rod 94 connects with a link 98 which reciprocates on a vertical slider 99 and drives a die block 100, carrying a punch 102 into and out of a platen 104 for trimming the leading and trailing ends of film positioned therein. A scrap chute 106 is positioned under the platen 104 to carry away scrap pieces of film.

The motor drive 36 and oscillating drive 40 operate portions of a unified assembly 108 (FIG. 2) including a tubular outer housing 110 mounted on the face plate 12 and rotatably supporting on bearings 112 an inner housing 114. The inner housing carries an arm 116 that supports the vacuum platen 42. Platen 42, as previously described and shown in FIG. 6, oscillates between a pickup position, facing downward against platen 104 of the trimming die press 28, and an attaching position, shown in solid lines in FIG. 6, in which the film trailing end 32 is positioned for attachment to the film spool 50. This oscillation is performed by the oscillating drive 40 which includes a timing pulley 118 attached to inner housing 114 and driven by a timing belt 120 from a drive pulley 122. The drive pulley is oscillated by a lever arm 124 and link 126 connected with a driving arm 128 of an oscillating drive 130. Movement of the arms and the ratio of the pulleys are such as to rotate the timing pulley 118 and the connected vacuum platen 42 through an arc of about 180 degrees.

The inner housing 114 also carries a pair of ball spline nuts 132 which support a spline shaft 134 for reciprocating motion. The spline shaft also supports a hollow inner shaft 136 for rotation on bearings 138. The inner shaft forms part of the motor drive 36 and is directly connected with a motor 140 at one end and with the quill 34 at the other end, rotation of the quill being directly controlled by rotation of the motor 140. A grooved collar 142, connected with the spline shaft 134 and the housing of motor 140, is engaged by a roller 143 carried on a horizontal slider 144 movable along a track 145. A follower 146, extending from the slider 144, is reciprocated by a cam 148 rotated in time with the other mechanisms through means not shown. This moves the slider along track 145, causing the roller 143 to slide the collar 142 leftward in FIG. 2. The collar 142 also carries the spline shaft 134 and inner shaft 136 leftward, retracting the associated quill 34 from the film roll forming position shown in FIG. 2 for a purpose to be subsequently described.

The attaching mechanism 46 includes an actuating cam 150 which drives a pivot arm 152 that extends through the face plate 12 and connects through a drive link 154, a smaller pivot arm 156 and a driver rod 158 with an oscillating arm 160, supporting an attaching blade 162 best shown in FIG. 6. A cartridge loader 164 (FIG. 1) is positioned to carry a cartridge 48 into position to replace the cartridge 48 of a completed film scroll, which is removed from the apparatus 10 by the gripper 58 and robot arm 56 in the manner previously described.

In operation of the apparatus 10, after a previously assembled scroll and cartridge have been removed, the shuttle mechanism 26 is actuated causing vacuum tip 80 to pick up and move the trimmed leading edge 30 of the bulk film 16 across the die platen 104 to engage the quill 34. The vacuum tip 80 then releases and retracts and the quill 34 is rotated by the motor drive 36 to wind a pre-selected length of film thereon to form a film roll 38, vacuum metering drum 24 acting together with registration sensor 18 to cut off the motor drive when the proper length of film has been wound on the quill 34.

At this point, the vacuum platen or film flipper 42 is oscillated by the drive 40 to the loading position (FIG. 3) and the vacuum tip 80 of the shuttle mechanism 28 is also moved down so that both vacuum members 42, 80 rest against the film and hold it in position. The punch 102 of the trimming die press 28 is then actuated to cut the film and form the trailing end 32 of the film roll and the leading end 30 of the next film roll.

Upon retraction of the punch 102, the vacuum platen 42 picks up the trailing end 32 of the film (FIG. 3) and flips it over (FIG. 4) into the attaching position (FIG. 5) where it is aligned with an opening, not shown, in the cartridge 48. In this position, the attaching blade 44 is actuated by pivoting of the arm 160 by the attaching mechanism 46. Blade 44 engages openings in the trailing end 32 of the film and carries the film end 32 into the cartridge 48 (deleted from FIG. 5 for clarity) where it is positioned to engage and be rolled upon the film spool 50, thereby forming the film scroll 52 (including the film roll 38 connected with film spool 50) and associated cartridge 48.

The attaching blade 44 is then retracted and the scroll gripper 58 is positioned by robot arm 56 to engage the film roll 38 and the cartridge 48. The cartridge is held to the gripper by a vacuum holder 166 while the film roll 38 is grasped by end-gripping arms 168 and 170 together with clock spring roll holders 172 and 174, respectively associated with the end arms to prevent the film roll from loosening. A slot 176 in arm 168 provides for positioning of the gripper over the film roll 38 while the quill 34 is still in position.

When the gripper 58 is in position, cam 148 actuates the collar 142 of the unified assembly 108 to retract the motor 140 and spline shaft 134 so as to withdraw the quill 34 from within the film roll 38. The end arm 168 of the gripper 58 acts as a stripper to hold the film roll 52 in the gripper while the quill 34 is being laterally withdrawn from the film roll 38 through opening 176 in the arm 168. The robot arm 56 then removes the assembled scroll and associated cartridge 48 from the apparatus 10 which then resets by returning the quill 34 to its initial position so that the cycle may be repeated by advancing the previously trimmed leading edge of the bulk film 16 with the shuttle mechanism to contact the quill 34.

Meanwhile, the gripper 58 is moved by the robot arm 56 into position to deposit the scroll 52 and cartridge 48 into the camera recesses 62, 64, 66 as previously described, after which the cover 68 is placed on the camera enclosing the scroll in a lighttight compartment.

Figure 9:
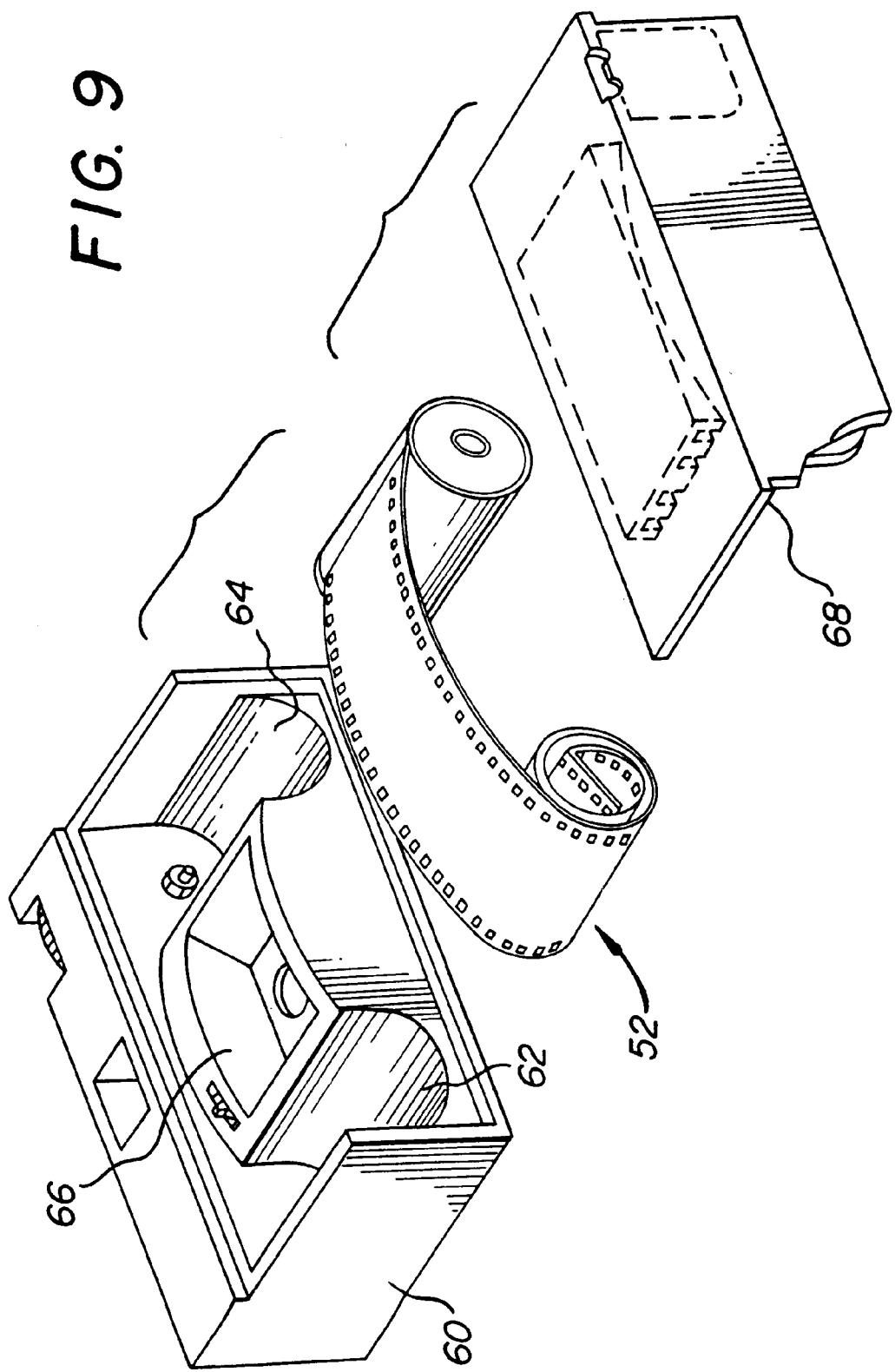
FIG. 9 is an exploded pictorial view of a camera body open for receiving an assembled film scroll and cartridge and a lighttight cover for closing the body.

FIG. 9 shows the camera body only; the gripper 58 is not shown for reasons of clarity.

Although the invention has been described by reference to certain specific embodiments, it should be understood that numerous changes may be made within the spirit and scope of the inventive concepts described. Accordingly, it is intended that the invention not be limited to the described embodiments, but that it have the full scope defined by the language of the following claims.

| Parts List |
| --- |
| 10. scroll forming apparatus |
| 12. face plate |
| 14. source (of film) web |
| 16. film |
| 18. registration sensor |
| 20. idler |
| 22. air turtleback |
| 24. vacuum metering drum |
| 26. shuttle mechanism |
| 28. trimming punch and die press |
| 30. leading end |
| 32. trailing end |
| 34. quill |
| 36. motor drive |
| 38. film roll |
| 40. oscillating drive |
| 42. vacuum platen |
| 44. attaching blade |
| 46. attaching mechanism |

-continued

Parts List 48. film cartridge
50. film spool
52. scroll
54. scroll retainer mechanism
56. robot arm
58. gripper
60. camera body
62. recess
64. recess
66. opening
68. cover
70. shuttle drive
72. drive arm
74. link
76. shuttle arm
78. shuttle bearing
80. vacuum tip
82. shaft
84. eccentric
86. link
88. drive lever
90. link
92. pivot
94. connecting rod
96. eccentric
98. link
99. slider
100. die block
102. punch
104. platen
106. scrap chute
108. unified assembly
110. outer housing
112. bearings
114. inner housing
116. arm
118. timing pulley
120. timing belt
122. drive pulley
124. lever arm
126. link
128. driving arm
130. oscillating drive
132. ball spline nuts
134. spline shaft
136. inner shaft
138. bearings
140. motor
142. collar
143. roller
144. horizontal slider
145. track
146. follower
148. cam
150. actuating cam
152. pivot arm
154. drive link
156. pivot arm
158. driver rod
160. arm
164. cartridge loader -continued Parts List 166. vacuum holder
168. end arm
170. end arm
172. clock spring holder
174. clock spring holder
176. slot
178. unified drive assembly
180. vacuum quill
182. small openings

What is claimed is:

1. A method of loading a photographic camera which has a non-lighttight body section with a first recess for receiving a scroll of film and a second recess for receiving a lighttight cartridge, the cartridge having an opening through which an outer end of the scroll extends into engagement with a spool enclosed in the cartridge, and a cover for closing the body section to make the camera lighttight, said method comprising steps of:

forming a filmstrip having first and second ends;

beginning at said first end, winding said filmstrip into a scroll on a quill with said second end outermost;

withdrawing the guill from the scroll;

positioning a lighttight cartridge having an enclosed spool and an opening through which an end of a filmstrip can be extended into engagement with said spool;

after said winding and positioning, inserting said second end into said cartridge into engagement with said spool, thereby forming an assembly of said scroll and said cartridge, with said scroll outside said cartridge;

positioning a non-lighttight camera body having a first recess for receiving said scroll and a second recess for receiving said cartridge;

after said inserting, depositing said scroll and said cartridge into said recesses with a portion of said filmstrip extending between said recesses; and fixing a cover onto said camera body to close said recesses and make the camera lighttight.

2. A method according to claim 1, wherein said forming comprises steps of:

withdrawing film from a bulk film roll as said winding proceeds; and after a predetermined length of film has been wound into said scroll, cutting said filmstrip from said bulk film roll to form said second end of said scroll.

3. A method according to claim 1, wherein said cutting also forms a first end of a succeeding filmstrip.

* * * * *